US008740201B1

(12) United States Patent
Sacherman

(10) Patent No.: US 8,740,201 B1
(45) Date of Patent: Jun. 3, 2014

(54) CARVING BOARD

(75) Inventor: James Sacherman, Genoa, NV (US)

(73) Assignee: Headwater Holding Company Ltd, Georgetown (KY)

( * ) Notice: Subject to any disclaimer, the term of this patent is extended or adjusted under 35 U.S.C. 154(b) by 0 days.

(21) Appl. No.: 13/463,155

(22) Filed: May 3, 2012

Related U.S. Application Data

(60) Provisional application No. 61/482,133, filed on May 3, 2011.

(51) Int. Cl.
*B23Q 3/00* (2006.01)
(52) U.S. Cl.
USPC .......................... 269/13; 269/289 R; 269/303
(58) Field of Classification Search
USPC ........................ 269/13, 289 R, 303
See application file for complete search history.

(56) References Cited

U.S. PATENT DOCUMENTS

| 2,796,902 | A | * | 6/1957 | Pearl | 269/13 |
| 5,363,755 | A | * | 11/1994 | Liang | 99/484 |
| 5,366,208 | A | * | 11/1994 | Benjamin | 269/13 |
| 2004/0119220 | A1 | * | 6/2004 | Davis | 269/289 R |
| 2010/0194016 | A1 | * | 8/2010 | Tsui | 269/302.1 |

* cited by examiner

*Primary Examiner* — Lee D Wilson
*Assistant Examiner* — Shantese McDonald
(74) *Attorney, Agent, or Firm* — Haverstock & Owens LLP

(57) ABSTRACT

A carving board comprising a board and a base. The board has a concave region that comprises at least one aperture, preferably disposed proximate the center of the concave region. The base is coupled to the board and comprises an interior space fluidly coupled to the aperture, thereby allowing liquid to drain from the concave region to the interior space via the at least one aperture. A stand is configured to mate with the base and to collect liquid that drains from the concave region and passes through the interior space of the base when mated with the base. The base and the stand are configured to enable a user to releasably lock the base to the stand by lowering the base onto the stand and rotating the base relative to the stand.

16 Claims, 5 Drawing Sheets

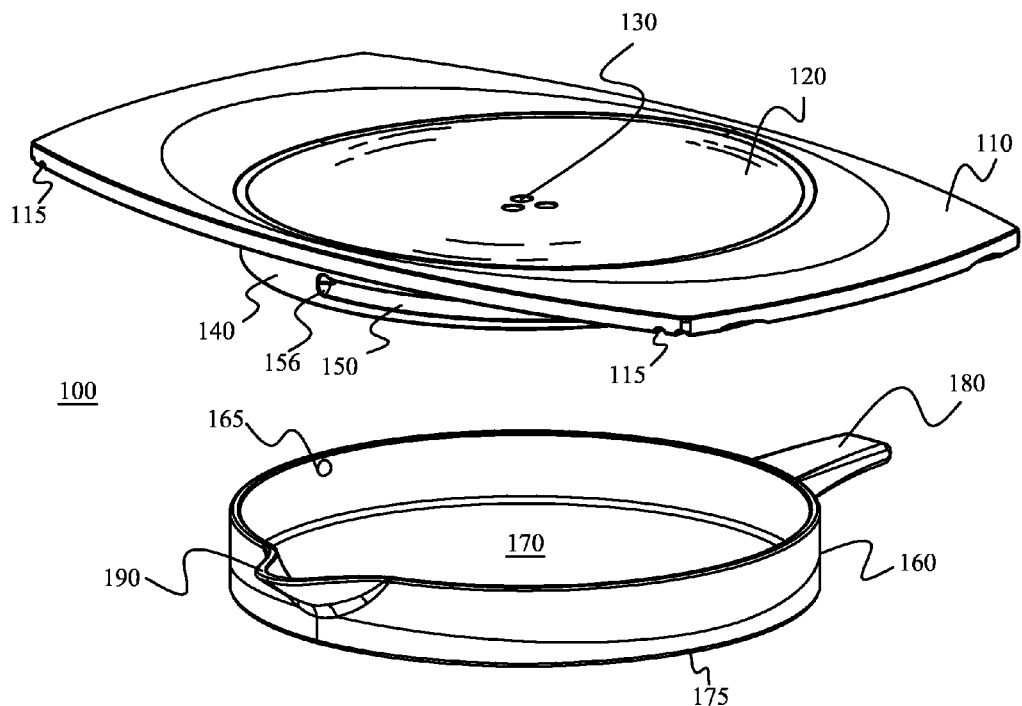
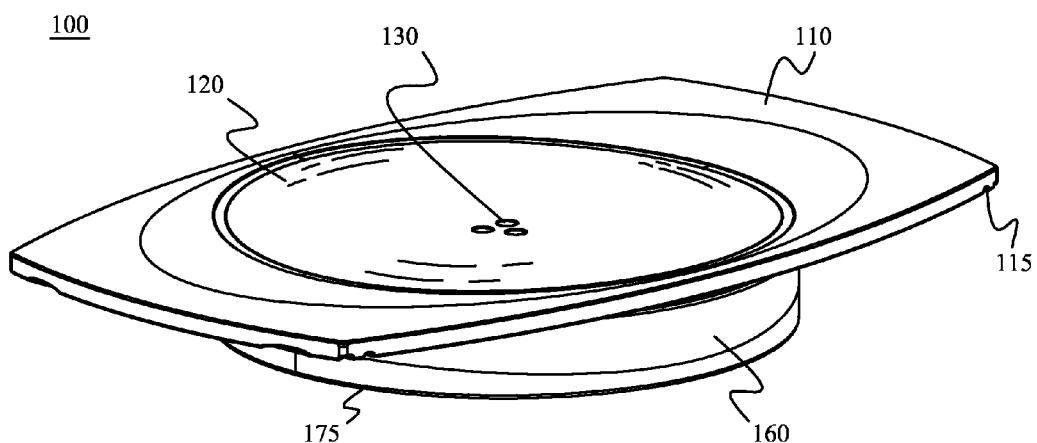
Fig. 1A
Fig. 1B

CARVING BOARD

CROSS REFERENCE TO RELATED APPLICATIONS

This application claims priority to co-pending U.S. Provisional Application Ser. No. 61/482,133, filed May 3, 2011, and entitled "Carving Board," which is hereby incorporated by reference in its entirety as if set forth herein.

FIELD OF THE INVENTION

The present invention relates to the field of carving boards. More particularly, the present invention relates to a carving board for cutting food.

BACKGROUND OF THE INVENTION

Prior art carving boards suffer from several deficiencies. First, they fail to adequately maintain the position of the food item being cut. As a result, there is a tendency for the food item to move around the board while the user is trying to cut it. This lack of positional stability can result in poor carving of the food item, the food item slipping and sliding off the board and onto the floor, and even hand injuries. Additionally, prior art carving boards fail to provide a way for liquid (e.g., juice from a turkey) to be directed away from the food item. As a result, the carving board can become quite messy and slippery as liquid emanates from the food item being cut, thereby interfering with the carving. Such deficiencies can become increasingly apparent when cutting certain food items such as a whole cooked turkey, which have a tendency to be big, moist, and slippery.

SUMMARY OF THE INVENTION

The present invention is directed towards a carving board that is configured to maintain the position of the food item and to direct fluid away from the food item. The carving board has a recessed or sunken region, preferably concave, in which the food item is held while being cut. Additionally, in some embodiments, the carving board comprises one or more apertures disposed in the recessed region in order to drain liquid. Furthermore, the present invention provides convenient means for attaching and removing the base of the carving board to and from an accompanying stand.

In one aspect of the present invention, a carving board comprises: a board having a concave region, wherein the concave region comprises at least one aperture; and a base coupled to the board, wherein the base comprises an interior space fluidly coupled to the at least one aperture, thereby allowing liquid to drain from the concave region to the interior space via the at least one aperture.

In some embodiments, the at least one aperture is disposed proximate the center of the concave region. In some embodiments, the at least one aperture comprises a plurality of apertures. In some embodiments, the board comprises metal, plastic, or wood.

In some embodiments, the carving board further comprises a stand, wherein the stand is configured to mate with the base and to collect liquid that drains from the concave region and passes through the interior space of the base when mated with the base. In some embodiments, the stand comprises a spout configured to enable a user to pour out liquid that is collected in the stand. In some embodiments, the stand comprises a handle. In some embodiments, the stand has a bottom surface that comprises rubber. In some embodiments, the stand comprises plastic. In some embodiments, the shape of the base and the shape of the stand correspond to one another. In some embodiments, the base and the stand each comprise a substantially circular shape.

In some embodiments, the base and the stand are configured to enable a user to releasably lock the base to the stand by lowering the base onto the stand and rotating the base relative to the stand. In some embodiments, the base and the stand are configured to mate and releasably lock using a first slot, a second slot, a first pin, and a second pin, wherein the first pin is configured to fit within the first slot and the second pin is configured to fit within the second slot. In some embodiments, the base and the stand each have a sidewall, the first and second slots are disposed on the sidewall of one of the base and the stand, and the first and second pins are disposed on the sidewall of the other one of the base and the stand. In some embodiments, the first and second slots are disposed on the sidewall of the base and the first and second pins are disposed on the sidewall of the stand. In some embodiments, the first and second slots each comprise a vertical slot that extends substantially vertically from a bottom end of the base to a horizontal slot that extends substantially horizontally across a portion of the circumference of the base sidewall, and the first and second slots and the first and second pins are configured to enable a user to lower the base onto the stand, with the pins each passing through their respective vertical slot, and then to rotate the base relative to the stand, with the pins each passing through their respective horizontal slot. In some embodiments, the first and second slots are disposed on substantially opposite sides of the base from one another, and the first and second pins are disposed on substantially opposite sides of the stand from one another.

In another aspect of the present invention, a carving board system comprises: a board having a concave region, wherein the concave region comprises a curve; and a knife having a blade bottom, wherein the blade bottom comprises a curve that substantially matches the curve of the concave region.

In some embodiments, the concave region of the board comprises at least one aperture. In some embodiments, the carving board system further comprises a base coupled to the board, wherein the base comprises an interior space fluidly coupled to the at least one aperture, thereby allowing liquid to drain from the concave region to the interior space via the at least one aperture.

BRIEF DESCRIPTION OF THE DRAWINGS

FIG. 1A is an exploded perspective view of one embodiment of a carving board system in accordance with the principles of the present invention.

FIG. 1B is an assembled perspective view of one embodiment of a carving board system in accordance with the principles of the present invention.

DETAILED DESCRIPTION OF THE INVENTION

The description below concerns several embodiments of the invention. The discussion references the illustrated preferred embodiment. However, the scope of the present invention is not limited to either the illustrated embodiment, nor is it limited to those discussed, to the contrary, the scope should be interpreted as broadly as possible based on the language of the Claims section of this document.

This disclosure provides several embodiments of the present invention. It is contemplated that any features from any embodiment can be combined with any features from any other embodiment. In this fashion, hybrid configurations of the illustrated embodiments are well within the scope of the present invention.

Figure 2:
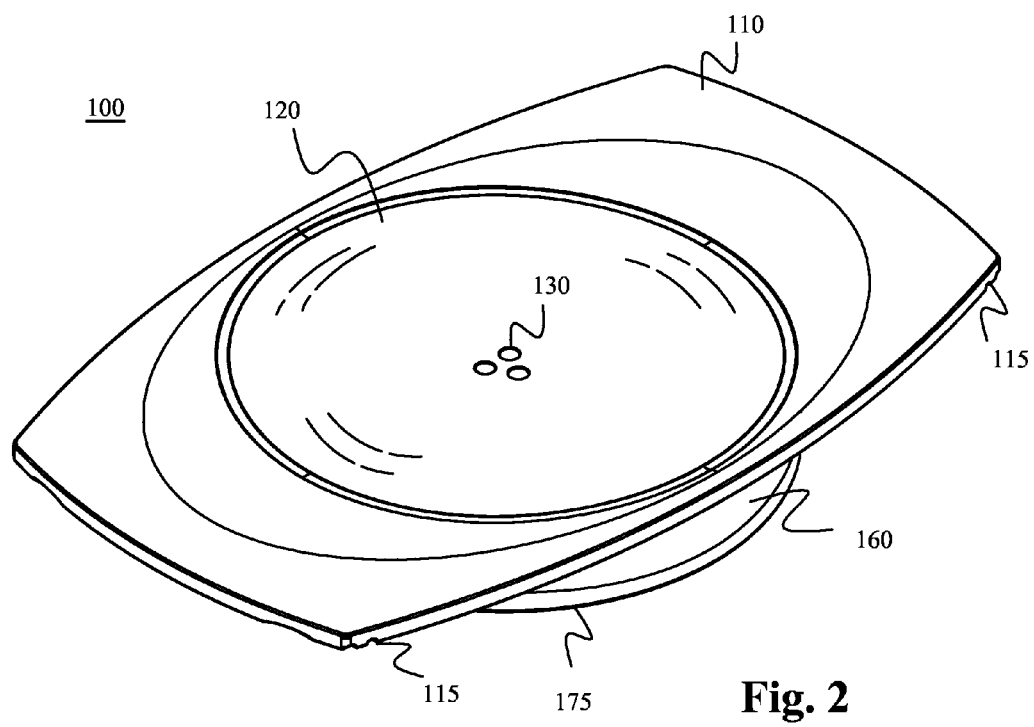
FIG. 2 is another perspective view from one angle of one embodiment of a carving board system in accordance with the principles of the present invention.
Figure 3:
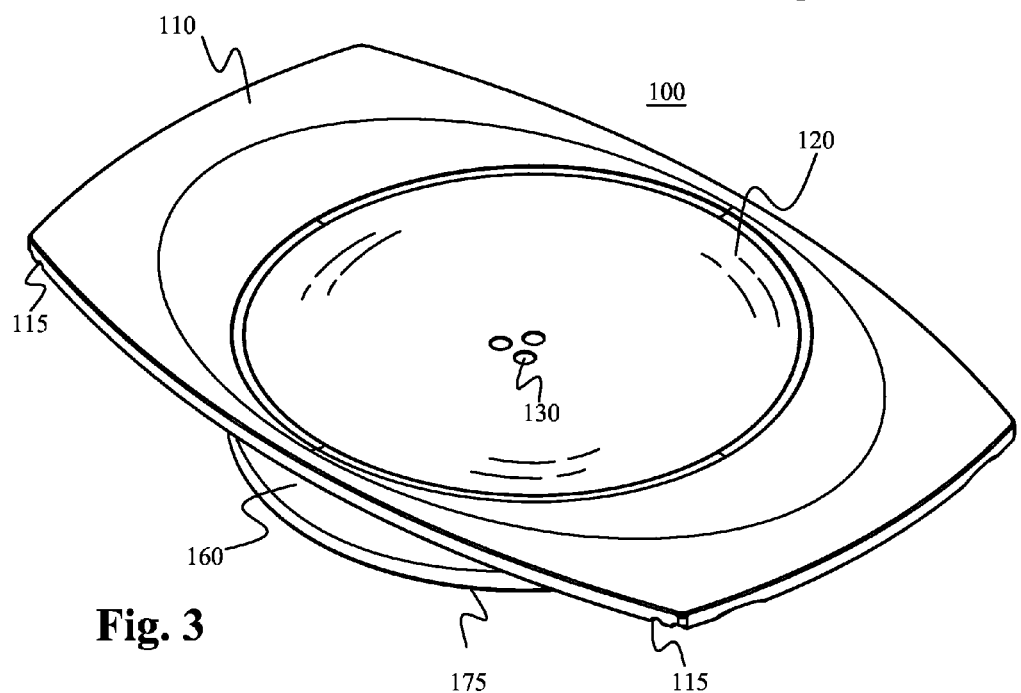
FIG. 3 is yet another perspective view from another angle of one embodiment of a carving board system in accordance with the principles of the present invention.
Figure 4:
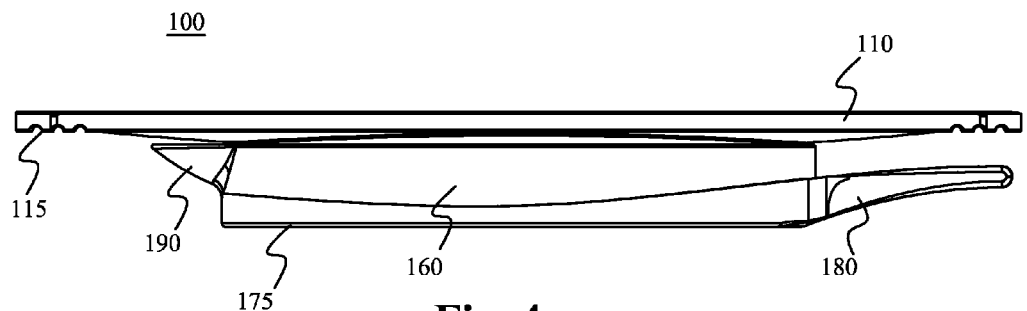
FIG. 4 is a side view of one embodiment of a carving board system in accordance with the principles of the present invention.
Figure 5:
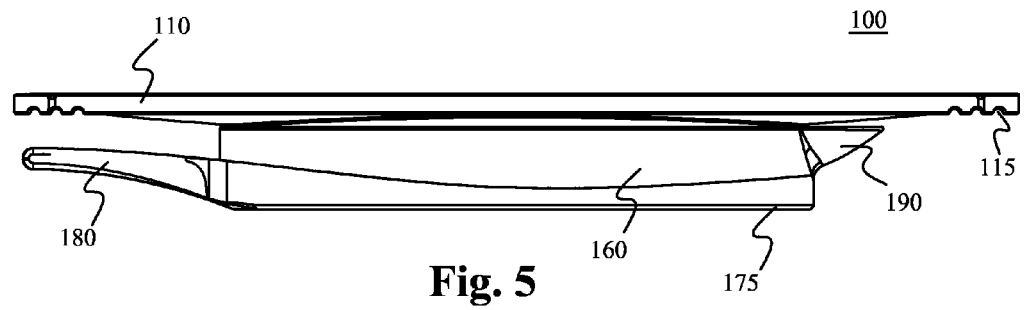
FIG. 5 is another side view of one embodiment of a carving board system in accordance with the principles of the present invention.
Figure 6:
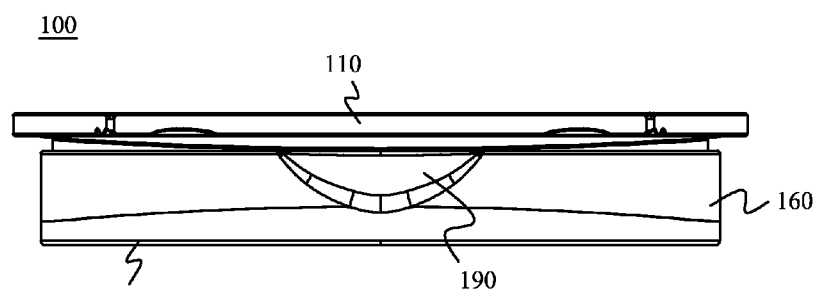
FIG. 6 is a front view of one embodiment of a carving board system in accordance with the principles of the present invention.
Figure 7:
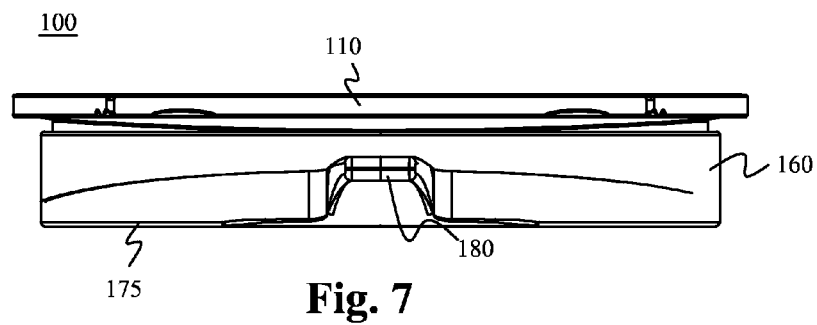
FIG. 7 is a rear view of one embodiment of a carving board system in accordance with the principles of the present invention.
Figure 8:
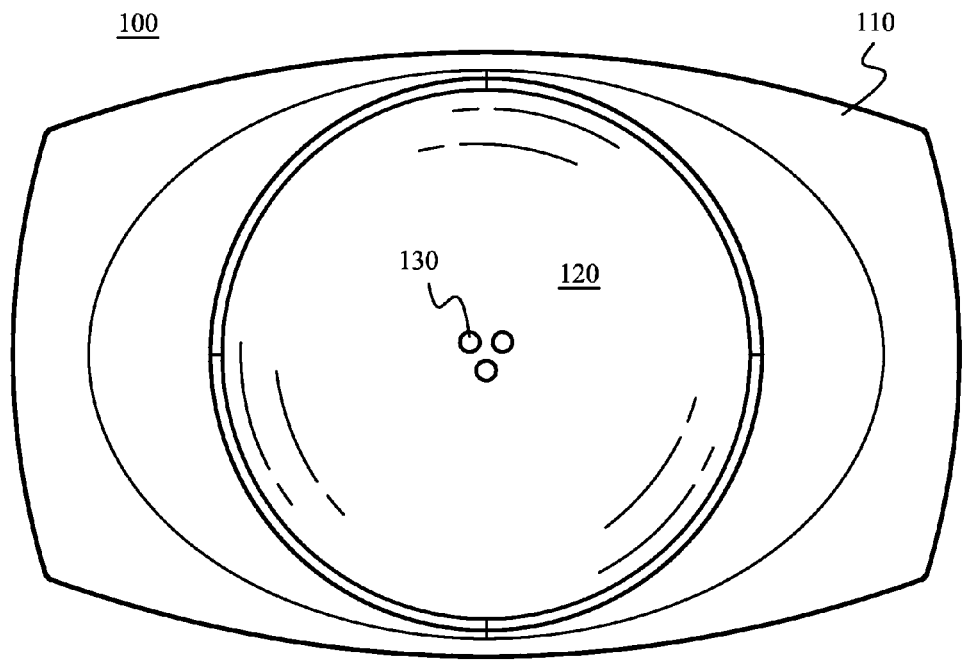
FIG. 8 is a top view of one embodiment of a carving board system in accordance with the principles of the present invention.
Figure 9:
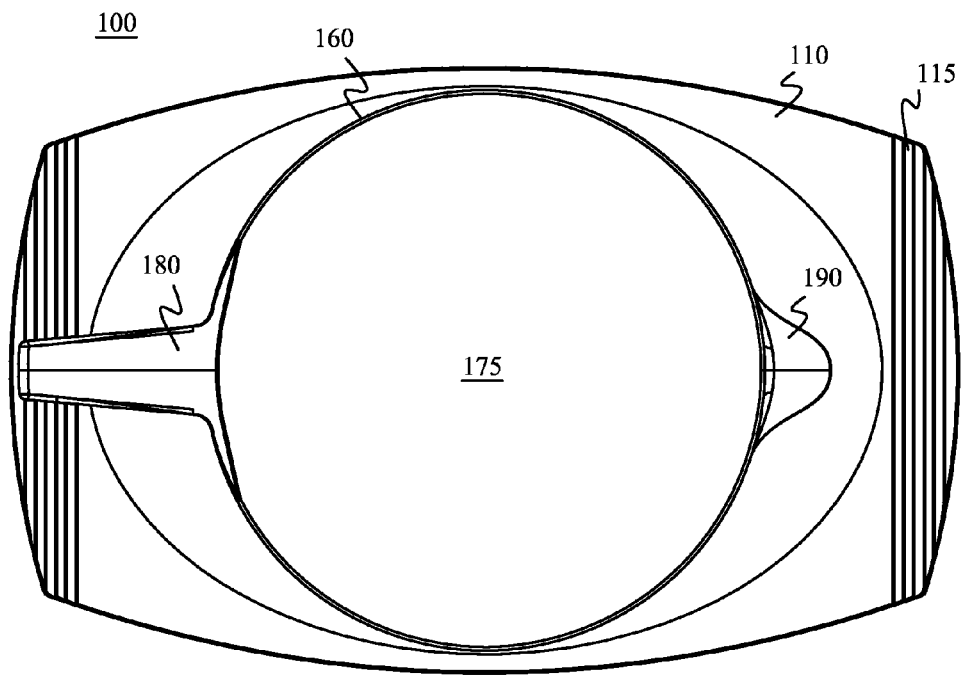
FIG. 9 is a bottom view of one embodiment of a carving board system in accordance with the principles of the present invention.
Figure 10:
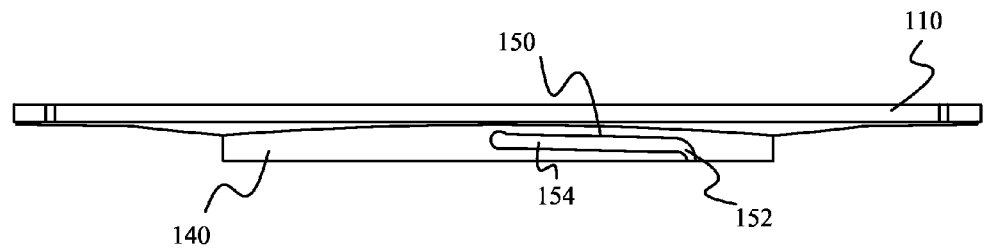
FIG. 10 is a left side view of one embodiment of a carving board in accordance with the principles of the present invention.
Figure 11:
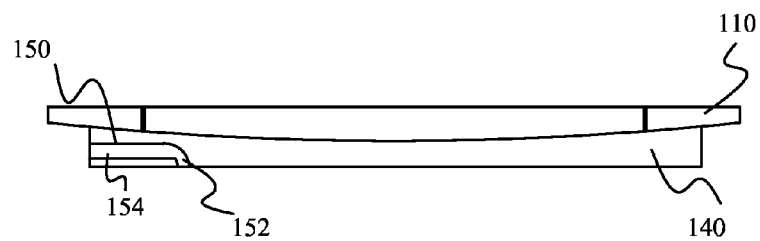
FIG. 11 is a front side view of one embodiment of a carving board in accordance with the principles of the present invention.
Figure 12:
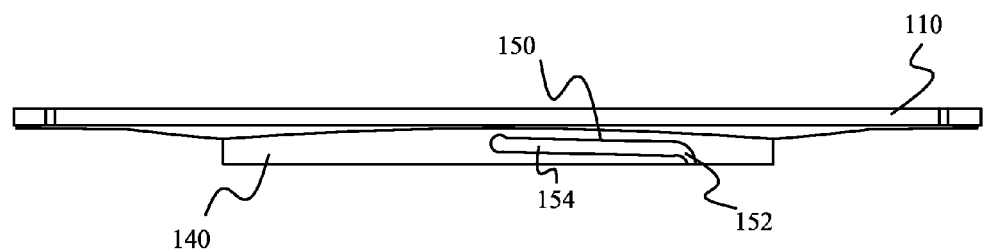
FIG. 12 is a right side view of one embodiment of a carving board in accordance with the principles of the present invention.
Figure 13:
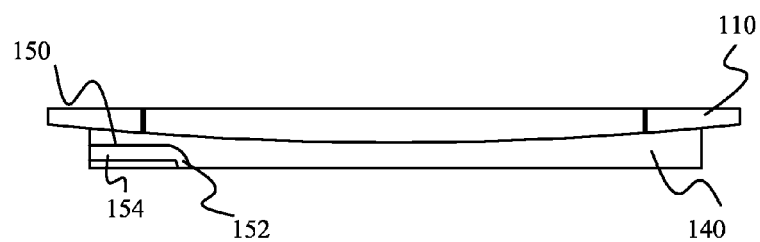
FIG. 13 is a rear side view of one embodiment of a carving board in accordance with the principles of the present invention.

FIGS. 1A-13 illustrate different embodiments and views of a carving board system 100, with like elements being numbered alike. System 100 comprises a carving board 110 and a stand 160.

Carving board 110 has a top surface and a bottom surface. The top surface comprises a recessed region 120 that is configured to accept a food item, such as a whole cooked turkey. This sunken region 120 provides a depressed contour suited for decreasing the mobility of the food item during the carving process. In a preferred embodiment, the recessed region 120 is concave, thereby forming an upside-down dome in the top surface of the caving board 110. However, it is contemplated that other shapes for the recessed region 120 are within the scope of the present invention. Furthermore, in a preferred embodiment, the recessed region 120 is disposed at or near the center of the length of the carving board 110, leaving a substantially flat top surface flanking the recessed region 120. In some embodiments, grooves and/or ridges 115 are formed in the bottom surface of the carving board 110 in order to aid in gripping the board 110.

In some embodiments, the top surface comprises one or more apertures 130, preferably disposed in the recessed region 120. The apertures 130 are big enough to drain liquid and small debris from the food item being carved, yet small enough to prevent the food item from falling through. In some embodiments, the apertures 130 are substantially circular. However, it is contemplated that other aperture shapes are within the scope of the present invention. In a preferred embodiment, the apertures 130 are positioned in or proximate the center of the recessed region 120, thereby allowing the recessed region 120 to efficiently direct the liquid into the apertures 130.

In some embodiments, a base 140 is coupled to the bottom surface of the carving board 110. Preferably, the base 140 is a wall that forms a hollowed-out interior space that is fluidly coupled to the aperture(s) 130, thereby allowing liquid and small debris to drain from the concave region 120 to the interior space via the aperture(s) 130. In some embodiments, the base 140 has a substantially circular or ring-like shape. However, it is contemplated that other shapes are within the scope of the present invention. In some embodiments, the base 140 is formed integrally with the carving board 110 in a fixed position. In some embodiments, the base 140 is removably attached to the carving board 110, such as by a locking means.

In a preferred embodiment, the carving board 110, including the recessed region 120, is formed from a rigid material. In some embodiments, the carving board 110 comprises metal. In some embodiments, the carving board 110 comprises plastic. In some embodiments, the carving board 110 comprises wood or bamboo. Preferably, the recessed region 120 comprises the same rigid material as the rest of the carving board 110. However, it is contemplated that other materials and configurations are within the scope of the present invention.

In some embodiments, a stand 160 is provided. Stand 160 is configured to stabilize the board 110. Stand 160 is also configured to receive the drained liquid and small debris that passes through the interior space of the base 140. Accordingly, stand 160 preferably comprises a container-like shape configured to collect the drained liquid and small debris. In a preferred embodiment, stand 160 is shaped like a pan, as shown in the figures. Stand 160 is preferably configured to receive base 140. In some embodiments, stand 160 is configured to mate with base 140, with the shape of stand 160 corresponding to the shape of base 140. As shown in the figures, base 140 and stand 160 both have a substantially circular shape. However, it is contemplated that other shapes are within the scope of the present invention. In some embodiments, the body of the stand 160, including its interior surface 170, is formed from plastic. However, it is contemplated that the body of the stand 160 can be formed from other materials. Furthermore, in some embodiments, the bottom surface 175 of the stand 160 comprises rubber, thereby preventing the stand 160 from sliding on a slick kitchen counter. However, it is contemplated that the bottom surface 175 of the stand 160 can comprise other materials. In some embodiments, a handle 180 is provided on the stand 160 in order to enable a user to easily move the stand 160. In some embodiments, a spout 190 is provided on the stand 160, thereby allowing the user to easily pour out any liquid that is collected in the interior space of the stand 160.

Attaching and removing the base 140 to and from the stand 160 can be challenging with only two hands and a platter full of weighty food. Therefore, the present invention provides a unique and convenient way of coupling and de-coupling the base 140 and the stand 160 simply by mating the two and rotating one with respect to the other. In a preferred embodiment, the base 140 comprises a slot 150 that is configured to accept a pin 165 that is disposed on the sidewall of the stand 160. The pin is preferably a solid rigid material that extends from the sidewall of the stand 160. Preferably, the slot 150 does not extend all the way through the sidewall of the base 140 from the outside surface to the inside surface. In a preferred embodiment, the slot 150 only extends partially through the sidewall, enough to provide clearance for the pin 165. Additionally, the slot 150 is preferably disposed on the exterior surface of the sidewall of the base 140, while the pin 165 is disposed on the interior surface of the sidewall of the stand 160. However, in some embodiments, their positions can be reversed, with the slot 150 on the interior surface of the base 140 and the pin 165 on the exterior surface of the stand 160, so long as other features of the present invention are adjusted as needed (e.g., the handle 180 and the spout 190 might need to be removed to allow the base 140 to fit around the stand 160).

Slot 150 preferably comprises a vertical slot 152 that extends from the bottom end of the base 140 to a horizontal slot 154, thereby allowing the pin 165 to enter the slot 150 by passing through the vertical slot 152 at the bottom end of the base 140 while the user lowers the board 110 onto the stand 160, with the sidewall of the stand 160 fitting around the sidewall of the base 140 like a sleeve. The horizontal slot 154 extends substantially horizontally across a portion of the circumference of the base sidewall. In some embodiments, the horizontal slot 154 is substantially parallel to the horizontal plane of the board 110. In some embodiments, the horizontal slot 154 is pitched at a very slight angle that is not substantially parallel to the horizontal plane, such as at a slight incline. In a preferred embodiment, the vertical slot 152 gradually ramps into the horizontal slot 154. Although, it is contemplated that a sharp 90-degree corner turn can be provided as the transition between the vertical slot 152 and the horizontal slot 154.

To install the board 110 onto the base 160, the user can simply hold the board 110 by its ends and lower the base 140 into the stand 160 with the vertical slot 152 aligned with the pin 165. As the pin 165 reaches the horizontal slot 154, the user turns the board 110 in the opposite direction that the horizontal slot 154 extends from the vertical slot 152, thereby enabling the pin 165 to meet the end of the horizontal slot 154. In a preferred embodiment, a detent 156 is provided at the end of the horizontal slot 154. It is contemplated that the detent 156 can alternatively or additionally be positioned in other locations on the base 140. The detent 156 is configured to come into contact with the sidewall of the stand 160 or the pin 165, thereby providing a form of resistance that prevents undesired rotation of the board 110. At this point, the cutting board 110 is stable and will not unscrew by mistake. A little push of the handle 180 lets the user overcome the detent 156 to allow the board 110 and the base 140 to be rotated and de-coupled from the stand 160. Since the base 160 preferably has a rubber bottom surface 175, enough friction is provided between the stand 160 and the work surface (e.g., the kitchen counter) so that the stand 160 does not turn in relation to the work-surface as the user turns the board 110. The user simply turns the board 110 the appropriate amount until the pin 165 reaches the vertical slot 152, and then lifts the board 110 straight up, with the stand 160 remaining on the work surface.

It is contemplated that any number of slots 150 and corresponding pins 165 are within the scope of the present invention. However, in a preferred embodiment, two slots 150 are provided, preferably on substantially opposite sides of the base 160 (i.e., centered approximately 180-degrees around the sidewall from one another). Likewise, two pins 165 are preferably provided on substantially opposite sides of the stand.

In a preferred embodiment, the horizontal slot 154 extends across approximately one-quarter of the circumference of the sidewall of the base 140 so that a 90-degree rotation of the board 110 brings the pin 165 either to the end of the horizontal slot 154 or into alignment with the vertical slot 152, depending on the direction of the rotation. In one example of its operation, a user places the board 110 onto the stand 160, with the vertical slot 152 aligned with the pin 165. When the pin 165 reaches the horizontal slot 154, the user rotates the board 110 counter-clockwise approximately 90-degrees. At the end of the rotation, the board 110 is locked in place by the detent 156. When the user is ready to remove the board 110 from the stand 160, the user rotates the board 110 clockwise approximately 90-degrees. At the end of the clockwise rotation, the pin 165 is aligned with the vertical slot 152, and the user lifts the board 110 off of the stand 160. It is contemplated that other horizontal slot lengths, as well as other locking and unlocking rotational directions and degrees, are within the scope of the present invention. For example, the horizontal slot 154 can be longer or shorter than one-quarter the circumference. A clockwise rotation can be required to couple the board 110 to the stand 160, while a counter-clockwise rotation can be required to de-couple the board 110 to the stand 160. The degree of rotation required for complete coupling and de-coupling can be greater than or less than 90-degrees.

As seen in the figures, the board 110 can be longer then it is wide, thereby having a lengthwise axis. In some embodiments, the slots are configured such that the lengthwise axis is aligned with the handle 180 and the spout 190 when the board 110 is in the locked position on the stand 160. In other embodiments, the slots are configured such that the lengthwise axis is substantially perpendicular to the axis formed between the handle 180 and the spout 190 when the board 110 is in the locked position on the stand 160. However, it is contemplated that other slot configurations are also within the scope of the present invention.

In some embodiments, the carving board 110 has a width of approximately 310 mm and a length of approximately 500 mm. In some embodiments, the length of the stand 160 is approximately 580 mm. In some embodiments, the collective height of the carving board 110 having its base 140 mated with the stand 160 is approximately 55 mm. In some embodiments, the collective height of the carving board 110 having its base 140 mated with the stand 160 is approximately 76 mm. However, it is contemplated that other widths, lengths, and heights are within the scope of the present invention.

In some embodiments, a knife (not shown) is provided that is specifically configured to be used with the carving board 110. Prior art knives do not have blades that specifically correspond to curved surfaces. As a result, these prior art knives can bottom out before cutting all the way to the bottom of the food item. The present invention provides a knife that has a curved blade bottom that corresponds to the curve in the recessed region 120 of the carving board 110, thereby preventing the knife blade from bottoming out too early. Preferably, the curve of the knife blade matches the curve in the recessed region 120 of the carving board 110.

The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent to those skilled in the art that modifications can be made to the embodiments chosen for illustration without departing from the spirit and scope of the invention.

What is claimed is:
1. A carving board comprising:
 a board having a concave region, wherein the concave region comprises at least one aperture;

a base coupled to the board, wherein the base comprises an interior space fluidly coupled to the at least one aperture, thereby allowing liquid to drain from the concave region to the interior space via the at least one aperture; and a stand configured to mate with the base and to collect liquid that drains from the concave region and passes through the interior space of the base when mated with the base.

2. The carving board of claim 1, wherein the at least one aperture is disposed proximate the center of the concave region.

3. The carving board of claim 1, wherein the at least one aperture comprises a plurality of apertures.

4. The carving board of claim 1, wherein the stand comprises a spout configured to enable a user to pour out liquid that is collected in the stand.

5. The carving board of claim 1, wherein the stand comprises a handle.

6. The carving board of claim 1, wherein the stand has a bottom surface that comprises rubber.

7. The carving board of claim 1, wherein the stand comprises plastic.

8. The carving board of claim 1, wherein the shape of the base and the shape of the stand correspond to one another.

9. The carving board of claim 8, wherein the base and the stand each comprise a substantially circular shape.

10. The carving board of claim 1, wherein the base and the stand are configured to enable a user to releasably lock the base to the stand by lowering the base onto the stand and rotating the base relative to the stand.

11. The carving board of claim 10, wherein the base and stand are configured to mate and releasably lock using a first slot, a second slot, a first pin, and a second pin, wherein the first pin is configured to fit within the first slot and the second pin is configured to fit within the second slot.

12. The carving board of claim 11, wherein:
the base and the stand each have a sidewall;
the first and second slots are disposed on the sidewall of one of the base and the stand; and
the first and second pins are disposed on the sidewall of the other one of the base and the stand.

13. The carving board of claim 12, wherein the first and second slots are disposed on the sidewall of the base and the first and second pins are disposed on the sidewall of the stand.

14. The carving board of claim 13, wherein:
the first and second slots each comprise a vertical slot that extends substantially vertically from a bottom end of the base to a horizontal slot that extends substantially horizontally across a portion of the circumference of the base sidewall; and
the first and second slots and the first and second pins are configured to enable a user to lower the base onto the stand, with the pins each passing through their respective vertical slot, and then to rotate the base relative to the stand, with the pins each passing through their respective horizontal slot.

15. The carving board of claim 14, wherein:
the first and second slots are disposed on substantially opposite sides of the base from one another; and
the first and second pins are disposed on substantially opposite sides of the stand from one another.

16. The carving board of claim 1, wherein the board comprises metal, plastic, or wood.

* * * * *